(12) United States Patent
Koyanagi

(10) Patent No.: US 9,475,940 B2
(45) Date of Patent: Oct. 25, 2016

(54) POLYARYLENE SULFIDE RESIN COMPOSITION AND MOLDED BODY

(71) Applicant: DIC Corporation, Tokyo (JP)

(72) Inventor: Shigeru Koyanagi, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/387,342

(22) PCT Filed: Mar. 22, 2013

(86) PCT No.: PCT/JP2013/058312
§ 371 (c)(1),
(2) Date: Sep. 23, 2014

(87) PCT Pub. No.: WO2013/141364
PCT Pub. Date: Sep. 26, 2013

(65) Prior Publication Data
US 2015/0080507 A1   Mar. 19, 2015

(30) Foreign Application Priority Data

Mar. 23, 2012   (JP) .................................. 2012-067272

(51) Int. Cl.
*C08L 81/04* (2006.01)
*C08L 23/26* (2006.01)
(52) U.S. Cl.
CPC ................ *C08L 81/04* (2013.01); *C08L 23/26* (2013.01)
(58) Field of Classification Search
CPC ......... C08L 81/04; C08L 91/00; C08L 23/26
See application file for complete search history.

(56) References Cited

U.S. PATENT DOCUMENTS

| 5,824,767 A | 10/1998 | Gupta et al. |
| 2002/0188096 A1 | 12/2002 | Tsubokura et al. |
| 2005/0222311 A1* | 10/2005 | Richter et al. ................ 524/275 |

FOREIGN PATENT DOCUMENTS

| JP | 63-089544 A | 4/1988 |
| JP | 63-118342 A | 5/1988 |
| JP | 02-272063 A | 11/1990 |
| JP | 2002-012762 A | 1/2002 |
| JP | 2003-226810 A | 8/2003 |

OTHER PUBLICATIONS

Clariant. Dispersion Agents for Engineering Resins Part IV. Oct. 2010.*
Clariant. Lubricants for Plastics Processing. Oct. 2010.*
International Search Report dated May 28, 2013, issued for PCT/JP2013/058312.

\* cited by examiner

*Primary Examiner* — John Uselding
(74) *Attorney, Agent, or Firm* — Locke Lord LLP

(57) ABSTRACT

A polyarylene sulfide resin composition containing a polyarylene sulfide resin (A) and an olefin wax (B) having an acid value within the range of 65 to 150 [mgKOH/g], wherein the amount of the olefin wax (B) is 0.01 to 5 parts by mass of relative to 100 parts by mass of the polyarylene sulfide resin (A) and the olefin wax (B) contains a carboxyl group and a carboxylic anhydride group. A molded product prepared by molding the composition is also provided. The polyarylene sulfide resin composition has excellent mechanical properties and mold releasing properties and the molded product prepared from the polyarylene sulfide resin composition exhibits good adhesion to epoxy resins.

4 Claims, 1 Drawing Sheet

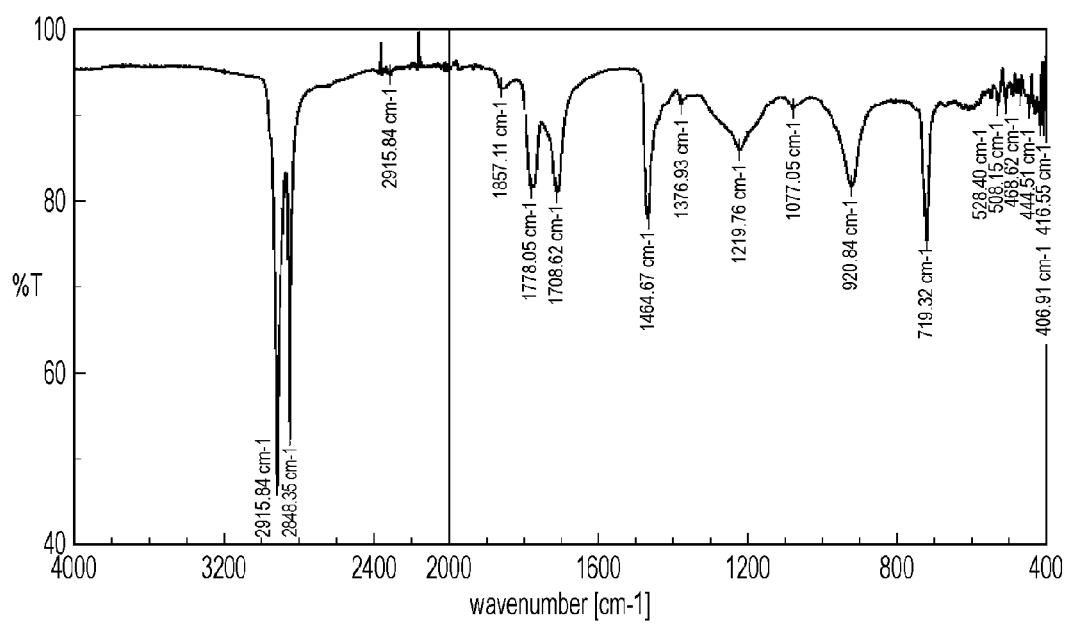

POLYARYLENE SULFIDE RESIN COMPOSITION AND MOLDED BODY

TECHNICAL FIELD

The present invention relates to a polyarylene sulfide resin (hereinafter may be referred to as a PAS resin) and in particular to a polyarylene sulfide resin composition that has good mechanical properties, heat resistance, and moldability as well as good adhesion to other resins such as epoxy resins.

BACKGROUND ART

Polyarylene sulfide resins have good mechanical strength, heat resistance, chemical resistance, moldability, and dimensional stability and due to these properties they are used in electric and electronic appliance parts, automobile parts, etc.

These parts are frequently bonded to part materials composed of epoxy resins and the like while these parts undergo secondary processing. However, polyarylene sulfide resins have relatively low adhesion to other resins, in particular, epoxy resins. Accordingly, for example, when polyarylene sulfide parts are bonded to each other or when a polyarylene sulfide resin is bonded to another material with an epoxy-based adhesive, or when sealing of electric and electronic parts is performed by using an epoxy resin, the low adhesion of the polyarylene sulfide resin to the epoxy resin (may simply be referred to as "adhesion") has posed a problem.

Methods for improving adhesion of such part materials have been proposed, in which the surface of a molded product is mechanically or chemically roughened so that the adhesion strength is improved by an anchoring effect. Examples these methods include using a mixed solution of chromic anhydride and sulfuric acid, a solution prepared by dissolving a Friedel-Crafts reaction catalyst in an organic solvent (for example, refer to PTL 1), or a treating agent containing chlorosulfonic acid and dichloroethane (for example, refer to PTL 2). However, these methods often involve use of dangerous drug harmful to human body and have not been recognized as practical due to environmental issues related to health and safety and wastewater treatment.

Also proposed is a method for improving adhesion of a polyarylene sulfide resin to an epoxy resin, the method involving adding carnauba wax to the polyarylene sulfide resin (for example, refer to PTL 3). However, although some improvement is observed in adhesion of a polyarylene sulfide resin, the adhesion is not sufficiently high for practical application; moreover, significant deterioration of mechanical strength was observed.

To address this issue, there have been proposed methods for reducing degradation of adhesion and mechanical strength, in which an oxidized polyethylene wax serving as a releasing agent is added to a polyarylene sulfide resin composition containing a polyarylene sulfide resin and a filler so as to improve the balance between the mold releasing property and the mechanical properties of the molded product (for example, refer to PTL 4 and PTL 5). However, in these cases also, the adhesive effect of the polyarylene sulfide resin is low and insufficient for practical application.

CITATION LIST

Patent Literature

PTL 1: Japanese Unexamined Patent Application Publication No. 63-089544

PTL 2: Japanese Unexamined Patent Application Publication No. 63-118342

PTL 3: Japanese Unexamined Patent Application Publication No. 2-272063

PTL 4: Japanese Unexamined Patent Application Publication No. 2002-012762

PTL 5: Japanese Unexamined Patent Application Publication No. 2003-226810

SUMMARY OF INVENTION

Technical Problem

An object of the present invention is to provide a polyarylene sulfide composition that has good mechanical properties and mold releasing property and improved adhesion to epoxy resins, and a molded product made of the composition.

Solution to Problem

The inventor of the present invention has conducted various studies and found that the adhesion to epoxy resins can be improved while maintaining good mechanical and mold releasing property when a high-acid-value olefin wax is added to a polyarylene sulfide resin. Thus, the inventor has made the present invention.

In other words, the present invention relates to a polyarylene sulfide resin composition including a polyarylene sulfide resin (A) and an olefin wax (B) containing a carboxyl group and a carboxylic anhydride group and having an acid value in the range of 65 to 150 [mgKOH/g], wherein the amount of the olefin wax (B) is in the range of 0.01 to 5 parts by mass relative to 100 parts by mass of the polyarylene sulfide resin (A).

Advantageous Effects of Invention

According to the present invention, a polyarylene sulfide composition having good mechanical and mold releasing properties and improved adhesion to epoxy resins and a molded product made of the composition can be provided.

BRIEF DESCRIPTION OF DRAWINGS

FIG. 1 is a FT-IR data of a releasing agent, "Licolub CE2", used in Example 1 of the present invention.

DESCRIPTION OF EMBODIMENTS

A polyarylene sulfide resin composition of the present invention contains a polyarylene sulfide resin (A) and an olefin wax (B) containing a carboxyl group and a carboxylic anhydride group and having an acid value in the range of 65 to 150 [mgKOH/g], in which the amount of the olefin wax (B) is in the range of 0.01 to 5 parts by mass relative to 100 parts by mass of the polyarylene sulfide resin (A).

The polyarylene sulfide resin (A) used in the present invention has a resin structure including a repeating unit in which an aromatic ring is bonded to a sulfur atom. To be specific, the polyarylene sulfide resin (A) is a resin that includes, as a repeating unit, a structural site represented by formula (1) below:

[Chem. 1]

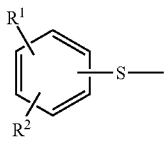

Formula (1)

(In the formula, R¹ and R² each independently represent a hydrogen atom, an alkyl group having 1 to 4 carbon atoms, a nitro group, an amino group, a phenyl group, a methoxy group, or an ethoxy group).

R¹ and R² in the structural site represented by formula (1) preferably each represent a hydrogen atom from the viewpoint of mechanical strength of the polyarylene sulfide resin (A). In such a case, bonding may occur in positions para to each other as represented by formula (2) or in positions meta to each other as represented by formula (3).

[Chem. 2]

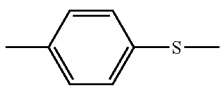

Formula (2)

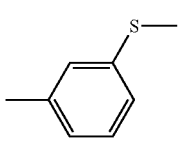

Formula (3)

Of these, a structure in which the sulfur atom is bonded at a para position relative to the aromatic ring in the repeating unit as represented by structural formula (2) is preferable from the viewpoints of heat resistance and crystallinity of the polyarylene sulfide resin (A).

The polyarylene sulfide resin (A) may contain not only the structural site represented by formula (1) but also structural sites represented by structural formulae (4) to (7) below so that the total of these structural sites and the structural site represented by formula (1) is 30 mol % or less.

[Chem. 3]

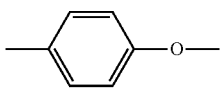

Formula (4)

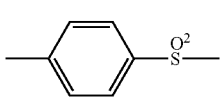

Formula (5)

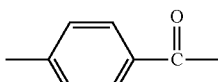

Formula (6)

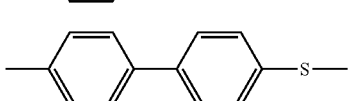

Formula (7)

In particular, in the present invention, the amount of the structural sites represented by formulae (4) to (7) above is preferably 10 mol % or less from the viewpoints of heat resistance and mechanical strength of the polyarylene sulfide resin (A). In the case where the polyarylene sulfide resin (A) contains structural sites represented by formulae (4) to (7) above, the resulting copolymer may take a form of a random copolymer or a block copolymer.

The polyarylene sulfide resin (A) may include, in its molecular structure, a trifunctional structural site represented by formula (8) below, a naphthyl sulfide bond, or the like.

[Chem. 4]

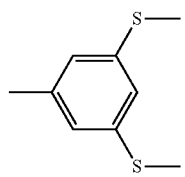

Formula (8)

The amount thereof is preferably 3 mol % or less and particularly preferably 1 mol % or less relative to the total number of moles of other structural sites.

The polyarylene sulfide resin (A) has a melt viscosity (V6) in the range of 2 to 1,000 [Pa·s] measured at 300° C. The melt viscosity (V6) measured at 300° C. is a melt viscosity observed after retaining a material for 6 minutes at a temperature of 300° C. and a load of 1.96 MPa while using an orifice having an orifice length/orifice diameter ratio of 10/1. The polyarylene sulfide resin (A) has a non-Newtonian coefficient in the range of 0.90 to 2.00. When a linear polyarylene sulfide resin is used, the non-Newtonian coefficient is preferably in the range of 0.90 to 1.20, more preferably in the range of 0.95 to 1.15, and most preferably in the range of 0.95 to 1.10. Such a polyarylene sulfide resin has good mechanical properties, flowability, and wear resistance. The non-Newtonian coefficient (N value) is a value calculated from the equation below from shear rate and shear stress observed with a capilograph at 300° C. and an orifice length (L)/orifice diameter (D) ratio (L/D) of 40.

[Math. 1]

$$SR = K \cdot SS^N \qquad (II)$$

[where SR represents shear rate (sec⁻¹), SS represents shear stress (dyn/cm²), and K represents a constant.) The closer the N value is to 1, the more linear the structure of the polyarylene sulfide. The higher the N value, the more branched the structure.

The method for producing the polyarylene sulfide resin (A) is not particularly limited. Examples of the method include 1) a method in which a dihalogeno aromatic compound and, if needed, other copolymer components are polymerized in the presence of sulfur and sodium carbonate; 2) a method in which a dihalogeno aromatic compound and, if needed, other copolymer components are polymerized in a polar solvent in the presence of a sulfidizing agent; 3) a method in which p-chlorothiophenol and, if needed, other copolymer components are subjected to self-condensation; and 4) a method in which a sulfidizing agent, a dihalogeno aromatic compound, and, if needed, other copolymer components are reacted in an organic polar solvent. Among these methods, the method 4) is versatile and preferable. During the reaction, an alkali metal salt of carboxylic acid or sulfonic acid or an alkali hydroxide may be added to control the degree of polymerization. In particular, a product obtained by any of the following methods of the method 4) above is preferable: a method for producing a polyarylene sulfide resin in which a hydrogenated sulfidizing agent is introduced into a mixture of a heated organic polar solvent and a dihalogeno aromatic compound at a rate at which water can be eliminated from the reaction mixture so as to allow the dihalogeno aromatic compound to react with the sulfidizing agent in the organic polar solvent and the water content in the reaction system is controlled to be in the range of 0.02 to 0.5 mol per mole of the organic polar solvent (refer to Japanese Unexamined Patent Application Publication No. 07-228699); and a method in which a polyhaloaromatic compound, an alkali metal hydrosulfide, and an organic acid alkali metal salt are reacted in the presence of solid alkali metal sulfide and an aprotic polar organic solvent while controlling the amount of the organic acid alkali metal salt to 0.01 to 0.9 mol per mole of the sulfur source and controlling the water content in the reaction system to be in the range of 0.02 mol per mole of the aprotic polar organic solvent (refer to WO2010/058713 pamphlet).

The olefin wax (B) that contains a carboxyl group and a carboxylic anhydride group (—CO—O—CO—) used in the present invention (hereinafter may be simply referred to as the olefin wax (B)) is a wax having an olefin structure having polar groups including the carboxyl group and the carboxylic anhydride group and non-polar groups including olefin. Accordingly, during molding, the polar groups align on the resin molded product side and the non-polar groups align on the mold side and the olefin wax (B) acts as a releasing agent. In the present invention, a wax refers to a low-molecular-weight resin usually solid at 25° C. produced by polymerization and exhibiting a releasing effect as an additive for a polyarylene sulfide resin composition. Typically, the molecular weight (Mn) is in the range of 250 to 10000 and preferably in the range of 300 to 7000. When the molecular weight is less than 250, evaporation easily occurs from the vacuum vent during melt kneading or the like, and thus it is difficult for the wax to exhibit the releasing effect. Moreover, during molding, excessive bleed-out of the wax may occur, resulting in soiling of the mold. In contrast, when the molecular weight exceeds 10,000, bleed-out rarely occurs and the releasing effect is sometimes reduced.

An example of the olefin wax (B) containing a carboxyl group and a carboxylic anhydride group used in the present invention is a compound obtained by post-treating an olefin wax (b) to introduce a carboxyl group and a carboxylic anhydride group and the olefin wax (B) is preferably a compound modified by a post-treatment using maleic acid and/or maleic anhydride. The olefin wax (b) is preferably a polyethylene wax and/or a 1-alkene polymer since an excellent mold releasing effect is obtained. Any currently known method for producing a polyethylene wax may be employed. For example, ethylene may be polymerized at high temperature and high pressure, a polyethylene may be thermally decomposed, or a low-molecular-weight component may be isolated and purified from a polyethylene polymer. Another example of the olefin wax (b) is a compound obtained by copolymerizing a compound containing a carboxyl group and/or a carboxylic anhydride group copolymerizable with monomers used in polymerization or copolymerization of ethylene and/or 1-alkene, and is preferably a compound obtained by copolymerizing maleic anhydride or maleic anhydride and maleic acid. Such a product of copolymerization is preferred since the carboxyl group and the carboxylic anhydride group are stable and are contained in high concentrations. Examples of the 1-alkene include propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, and 1-nonacosene. The aliphatic hydrocarbon group constituting the olefin wax (B) used in the present invention may be linear or branched or may contain an unsaturated bond, an ester bond, or an ether bond in some part. Specific examples of the olefin wax (B) include DIACARNA 3 (Mitsubishi Chemical Corporation) and Licolub CE2 (Clariant Japan).

The acid value of the olefin wax (B) used in the present invention is 65 mgKOH/g or more and 150 mgKOH/g or less, preferably 70 mgKOH/g or more and 120 mgKOH/g or less, and most preferably 75 mgKOH/g or more and 90 mgKOH/g or less. The acid value affects adhesion of the molded product to other resins such as epoxy resins. The acid value can be measured by a method provided in JIS K 3504. In particular, the acid value is measured as the number of milligrams of potassium hydroxide needed to neutralize free fatty acids contained in 1 g of a wax. The acid value is measured in the same manner in the examples described below. The olefin wax (B) used in the present invention has a high acid value compared to waxes usually used as releasing agents for polyarylene sulfide resins. Accordingly, the olefin wax (B) is preferable since the olefin wax (B) bleeding into the surface of the molded product exhibits a good mold releasing effect and improves adhesion to other resins such as epoxy resins.

The dropping point of the olefin wax (B) is in the range of 50° C. or more and 100° C. or less, preferably in the range of 60° C. or more and 90° C. or less, and yet more preferably in the range of 70° C. or more and 80° C. or less. The dropping point can be measured by a method provided in ASTM D127. In particular, the dropping point is measured as a temperature at which a first drop of a molten wax falls from a metal nipple. The dropping point is measured in the same manner in the examples below. When the dropping point is within the above-described range, the olefin wax (B) improves the mold releasing property of the molded product from a mold and has good effects on the continuous molding property. Moreover, bleeding of the olefin wax (B) into the surface of the molded product readily occurs within the above-mentioned range. During melt-kneading of the polyarylene sulfide resin composition, the olefin wax (B) melts sufficiently. As a result, the olefin wax (B) substantially uniformly disperses in the molded product. Accordingly, segregation of the olefin wax (B) in the surface of the molded product is suppressed and soiling of the mold and deterioration of the appearance of the molded product can be reduced.

The olefin wax (B) content in the polyarylene sulfide resin composition is 0.01 part by mass or more and 5 parts by mass or less, preferably 0.5 part by mass or more and 1 part by mass or less, and most preferably 0.1 part by mass or more and 0.5 part by mass or less relative to 100 parts by mass of the polyarylene sulfide resin (A). The molded product exhibits good mold releasing property from the mold when the olefin wax (B) content is within the above-described range. Moreover, adhesion to other resins such as epoxy resins is enhanced. Furthermore, soiling of the mold during molding and deterioration of the appearance of the molded product can be suppressed.

In the present invention, other releasing agents can be used in combination as long as the effects of using the olefin wax (B) are not impaired. Examples of the releasing agents that can be used in combination include natural waxes such as carnauba waxes, metal salts of higher fatty acids such as zinc stearate, and polyolefin waxes such as oxidized or non-oxidized polyethylene waxes.

The resin composition of the present invention may further contain a filler (C) in addition to the components described above in order to further improve performance in terms of strength, heat resistance, dimensional stability, etc.

Any common material can be used as the filler as long as the effects of the present invention are not impaired. For example, fillers with various shapes, such as granular and fibrous fillers, can be used.

Specific examples of the filler include fibrous fillers such as glass fibers, carbon fibers, silane glass fibers, ceramic fibers, aramid fibers, metal fibers, fibers composed of potassium titanate, silicon carbide, calcium sulfate, calcium silicate, or the like, and natural fibers such as wollastonite. Barium sulfate, calcium sulfate, clay, pyrophyllite, bentonite, sericite, zeolite, mica, talc, attapulgite, ferrite, calcium silicate, calcium carbonate, magnesium carbonate, glass beads, and the like can also be used.

The filler used in the present invention is not an essential component. Adding more than 0 part by mass and preferably 15 parts by mass to 250 parts by mass of the filler relative to 100 parts by mass of the polyarylene sulfide resin can improve various properties such as strength, stiffness, heat resistance, a heat releasing property, and dimensional stability in accordance with the purpose of the filler added.

The resin composition of the present invention can contain various additives during molding as long as the effects of the present invention are not impaired. Examples of the additives include a colorant, a heat resistance stabilizer, a UV stabilizer, a blowing agent, an anti-rust agent, a flame retarder, and a lubricant. Depending on the usage, the resin composition may be used as a resin composition that contains a synthetic resin such as polyester, polyamide, polyimide, polyetherimide, polycarbonate, polyphenylene ether, polysulfone, polyethersulfone, polyether ether ketone, polyether ketone, polyarylene, polyethylene, polypropylene, polyethylene tetrafluoride, polyethylene difluoride, polystyrene, ABS resin, epoxy resin, silicone resin, phenolic resin, urethane resin, a liquid crystal polymer, or the like, an elastomer such as polyolefin-based rubber, fluorine rubber, silicone rubber, or the like, a coupling agent, and, if needed, additives such as a filler.

The amounts of the additives used vary according to the purposes and cannot be generally specified but may be appropriately adjusted according to the purpose and usage within the range of 0.01 to 1000 parts by mass relative to 100 parts by mass of the polyarylene sulfide resin (A) as long as the effects of the present invention are not impaired. The methods of use of these additives also vary according to the purpose and cannot be generally specified. However, for example, a coupling agent may be used to pre-treated a filler but is preferably used alone as an additive. Examples of the coupling agent include silane-based coupling agents and titanium-based coupling agents. Among these, a silane coupling agent is preferable and a silane coupling agent having a functional group (for example, an epoxy group, an isocyanato group, an amino group, or a hydroxyl group) reactive with a carboxyl group is more preferable. Examples of such a silane coupling agent include epoxy-group-containing alkoxysilane compounds such as γ-glycidoxypropyltrimethoxysilane, γ-glycidoxypropyltriethoxysilane, and β-(3,4-epoxycyclohexyl)ethyltrimethoxysilane, isocyanato-group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane, amino-group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane, hydroxyl-group-containing alkoxysilane compounds such as γ-hydroxypropyltrimethoxysilane and γ-hydroxypropyltriethoxysilane. The amount of the coupling agent used is 0.01 to 1.0 part by mass and more preferably 0.1 to 0.5 part by mass relative to 100 parts by mass of the polyarylene sulfide resin (A).

The polyarylene sulfide resin composition according to the present invention may be a polyarylene sulfide resin composition that contains, in addition to the components described above and depending on the usage, a synthetic resin such as polyester, polyamide, polyimide, polyetherimide, polycarbonate, polyphenylene ether, polysulfone, polyethersulfone, polyether ether ketone, polyether ketone, polyarylene, polyethylene, polypropylene, polyethylene tetrafluoride, polyethylene difluoride, polystyrene, ABS resin, an epoxy resin, a silicone resin, a phenolic resin, a urethane resin, or a liquid crystal polymer, or an elastomer such as a fluorine rubber or silicone rubber, in particular, a polyolefin elastomer having at least one functional group selected from the group consisting of an epoxy group, an amino group, a carboxyl group, an isocyanato group, and substructures represented by structural formulae (1) and (2) below:

[Chem. 5]

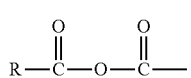

Structural formula (1)

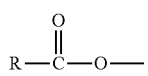

Structural formula (2)

(where, in structural formulae (1) and (2), R represents an alkyl group having 1 to 8 carbon atoms). The amounts of the resins used vary depending on the purpose and cannot be generally specified. For example, the amounts of the resins may be appropriately adjusted within the range of 0.01 to 1000 parts by mass relative to 100 parts by mass of the polyarylene sulfide resin (A) depending on the purpose and usage as long as the effects of the present invention are not impaired.

The method for producing the polyarylene sulfide resin composition according to the present invention is not particularly limited. An example of the method includes dry-blending a polyarylene sulfide resin (A) and an olefin wax (B), which are raw materials taking various forms such as powder, pellets, and chips, in a ribbon blender, a Henschel mixer, a V blender, or the like and then melt-kneading the resulting mixture by a Banbury mixer mixing roll, a single-screw or twin-screw extruder, a kneader, or the like. Among these, a melt kneading method that uses a single-screw or twin-screw extruder having sufficient kneading power is typically employed.

The polyarylene sulfide resin composition according to the present invention can be subjected to various molding methods such as injection molding, compression molding, extrusion molding involving forming composites, sheets, and pipes, pultrusion, blow-molding, and transfer-molding, but is particularly suitable for injection molding usage since it has an excellent mold releasing property.

The polyarylene sulfide resin composition according to the present invention has not only the inherent properties of the polyarylene sulfide resin such as mechanical strength, heat resistance, and dimensional stability but also excellent adhesion to resins, such as epoxy resins, other than polyarylene sulfide resins. Accordingly, the polyarylene sulfide resin composition has wide usages including the following: materials for fibers and films; electric and electronic parts such as sensors, LED lamps, connectors, sockets, resistors, relay cases, switches, coil bobbins, capacitors, variable capacitor cases, oscillators, various terminal plates, transformers, plugs, printed substrates, tuners, speakers, microphones, headphones, small motors, magnetic head bases, semiconductors, liquid crystals, FDD carriages, FDD chasses, motor brush holders, parabolic antennas, and computer-related parts; VTR parts, television parts, irons, hair dryers, rice cooker parts, microwave oven parts, acoustic parts, audio equipment parts such as audio laser disks or compact disks, home and office electric appliance parts such as lighting parts, refrigerator parts, air-conditioner parts, typewriter parts, and word-processor parts; machine-related parts such as office computer-related parts, phone-related parts, facsimile-related parts, copier-related parts, cleaning jigs, motor parts, lighters, and typewriters; optical instrument and precision instrument-related parts such as microscope, binoculars, cameras, and watches; plumbing parts such as faucet washers, combination faucets, pump parts, pipe joints, flow adjusting valves, relief valves, water temperature sensors, water flow sensors, and water meter housings; and automobile and vehicle-related parts such as valve alternator terminals, alternator connectors, IC regulators, potentiometer bases for light dimmers, various valves such as exhaust gas valves, various fuel-related, exhaust-system, and intake-system pipes, air intake nozzle snorkels, intake manifolds, fuel pumps, engine coolant joints, carburetor main bodies, carburetor spacers, exhaust gas sensors, coolant sensors, oil temperature sensors, throttle position sensors, crankshaft position sensors, airflow meters, brake pad wear sensors, air-conditioner thermostat bases, heater hot air flow control valves, brush holders for radiator motors, water-pump impellers, turbine vanes, wiper motor-related parts, distributors, starter switches, starter relays, wire harnesses for transmission, window washer nozzles, air-conditioning panel switch substrates, coils for fuel-related electromagnetic valves, connectors for fuses, horn terminals, insulating plates for electric parts, step motor rotors, lamp sockets, lamp reflectors, lamp housings, brake pistons, solenoid bobbins, engine oil filters, ignition device cases, capacitor cases for HEVs, vehicle speed sensor, and cable liners.

EXAMPLES

The present invention will now be specifically described by using Examples which do not limit the scope of the present invention.

[Melt Viscosity of Polyarylene Sulfide Resin]

The melt viscosity was measured with a flow tester (Koka-type flow tester "CFT-500D" produced by Shimadzu Corporation) after the resin was retained for 6 minutes at a temperature of 300° C. and a load of 1.96 MPa using an orifice having an orifice length/orifice diameter ratio of 10/1.

Examples 1 to 3 and Comparative Examples 1 to 4

Materials are uniformly mixed in a tumbler in accordance with the compositions and contents described in Tables 1 and 2. Then the blended material was placed in a twin-screw extruder TEM-35B equipped with a vent produced by Toshiba Machine Co., Ltd. and melt-kneaded at a resin component discharge rate of 25 kg/hr, a screw rotation rate of 250 rpm, and a resin temperature setting of 330° C. while the ratio of the resin component discharge rate (kg/hr) to the screw rotation rate (rpm) (discharge rate/screw rotation rate) was adjusted to 0.1 (kg/hr·rpm). As a result, pellets of the resin composition were obtained. Various evaluation tests were conducted by using the pellets. The results of the test and evaluation are shown in Tables 1 and 2.

[Bonding Strength of PAS Resin Composition to Epoxy Resin]

The resulting pellets were fed to an injection molding machine (SG75-HIPRO·MIII) produced by Sumitomo-Nestal whose cylinder temperature was set to 320° C. and injection molding was conducted with a die for forming an ASTM Type I dumbbell specimen at a die temperature of 130° C. As a result, an ASTM Type I dumbbell specimen was obtained. The ASTM Type I dumbbell specimen was divided into two equal pieces at the center, and a spacer (thickness: 1.8 to 2.2 mm, opening portion: 5 mm×10 mm) prepared to have a contact area of 50 $mm^2$ mm with an epoxy adhesive was placed between the two pieces of the ASTM Type I dumbbell specimen and fixed with a clip. Then an epoxy resin (two-component epoxy resin produced by Nagase ChemteX Corporation, base resin: XNR5002, curing agent: XNH5002, base resin/curing agent blend ratio=100:90) was poured into the opening portion and heated for 3 hours in a hot air drier set at 135° C. to conduct curing and bonding. The spacer was removed after the specimen was cooled at 23° C. for 1 day and the tensile strength at fracture of the resulting specimen was measured by using a tensile tester produced by Instron at a strain rate of 1 mm/min and a span of 80 mm at 23° C. The observed strength was divided by the bonding area and the result was assumed to be the epoxy bonding strength.

[Mechanical Strength]

The pellets were used to prepare an ISO Type-A specimen and the flexural strength was measured by a method provided in ISO178. In the measurement, a specimen prepared by using a regular mold and a specimen prepared by using a two-gate mold in which a welded portion was present at the center of the specimen were used.

In the tables, "flexural strength" refers to the flexural strength of a specimen that does not have a welded portion and "weld flexural strength" refers to the flexural strength of a specimen that has a welded portion.

TABLE 1

|  |  | Example | Comparative Example | | |
|---|---|---|---|---|---|
|  |  | 1 | 1 | 2 | 3 |
| Materials |  |  |  |  |  |
| PPS | A1 | 69.7 | 69.7 | 69.7 | 69.7 |
|  | A2 |  |  |  |  |
|  | A3 |  |  |  |  |
|  | A4 |  |  |  |  |
| Wax | B1 | 0.3 |  |  |  |
|  | B2 |  | 0.3 |  |  |
|  | B3 |  |  | 0.3 |  |
|  | B4 |  |  |  | 0.3 |
| Inorganic filler | C1 | 40 | 40 | 40 | 40 |
|  | C2 |  |  |  |  |
| Si | D1 |  |  |  |  |

TABLE 1-continued

|  | Example | Comparative Example | | |
|---|---|---|---|---|
|  | 1 | 1 | 2 | 3 |
| Evaluation item | | | | |
| Epoxy bonding strength | 1.20 | 0.93 | 1.03 | 1.01 |
| Flexural strength (MPa) | 274 | 270 | 276 | 260 |
| Weld flexural strength (MPa) | 108 | 106 | 110 | 90 |

TABLE 2

|  |  | Example 2 | Example 3 | Comparative Example 4 |
|---|---|---|---|---|
| Materials | | | | |
| PPS | A1 | 69.7 | 69.7 | 69.7 |
|  | A2 | | | |
|  | A3 | | | |
|  | A4 | | | |
| Wax | B1 | 0.3 | 0.3 | |
|  | B2 | | | 0.3 |
|  | B3 | | | |
|  | B4 | | | |
| Inorganic filler | C1 | 40 | 35 | 35 |
|  | C2 | | 30 | 30 |
| Si | D1 | 0.3 | | |
| Evaluation item | | | | |
| Epoxy bonding strength | | 1.18 | 1.60 | 1.14 |
| Flexural strength (MPa) | | 282 | 262 | 265 |
| Weld flexural strength (MPa) | | 99 | 96 | 98 |

In Tables 1 and 2, the blended resins and materials are as follows:

PPS (A1): polyphenylene sulfide (LR-2G produced by DIC Corporation, melt viscosity (V6): 80 [Pa·s])

PPS (A2): polyphenylene sulfide (MB600G produced by DIC Corporation, melt viscosity (V6): 200 [Pa·s])

PPS (A3): polyphenylene sulfide (T-2G produced by DIC Corporation, melt viscosity (V6): 55 [Pa·s])

Wax (B1): olefin wax having a carboxyl group and an acid anhydride group (Licolub CE2 produced by Clariant Japan, acid value: 84 mgKOH/g, dropping point: 73° C., FT-IR measurement data shown in FIG. 1 has peaks due to the acid anhydride near 1857 $cm^{-1}$ and 1778 $cm^{-1}$)

Wax (B2): polyethylene oxide wax (Licolub H12 produced by Clariant Japan, acid value: 19 mgKOH/g, dropping point: 106° C.)

Wax (B3): maleic acid-modified polyethylene wax (HW2203A produced by Mitsui Chemicals Inc., acid value: 30 mgKOH/g, dropping point: 111° C.)

Wax (B4): montan acid ester wax (Licolub WE4 produced by Clariant Japan, acid value: 29 mgKOH/g, dropping point: 81° C.)

Inorganic filler (C1): glass fibers (glass fiber chopped strands with fiber diameter: 10 μm and length: 3 mm)

Inorganic filler (C2): calcium carbonate (average particle diameter: 5 [μm])

Si (D1): γ-glycidoxypropyltrimethoxysilane

The invention claimed is:

1. A polyarylene sulfide resin composition comprising a polyarylene sulfide resin (A) and 0.01 to 5 parts by mass of an olefin wax (B) relative to 100 parts by mass of the polyarylene sulfide resin (A),
   wherein the olefin wax (B) has an acid value within the range of 70 to 120 [mgKOH/g] and a dropping point within the range of 60 to 90° C., and contains a carboxyl group and a carboxylic anhydride group.

2. The polyarylene sulfide resin composition according to claim 1, further comprising 15 to 250 parts by mass of a filler (C) relative to 100 parts by mass of the polyarylene sulfide resin (A).

3. A molded product prepared by melt-molding the polyarylene sulfide resin composition according to claim 1.

4. A molded product prepared by melt-molding the polyarylene sulfide resin composition according to claim 2.

* * * * *